H. C. MALLORY.
COOLING SYSTEM FOR INTERNAL COMBUSTION ENGINES.
APPLICATION FILED APR. 20, 1917.

1,424,664.

Patented Aug. 1, 1922.
4 SHEETS—SHEET 1.

Inventor
Harry C. Mallory
By his Attorneys
Edwards, Sager & Richmond

H. C. MALLORY.
COOLING SYSTEM FOR INTERNAL COMBUSTION ENGINES.
APPLICATION FILED APR. 20, 1917.

1,424,664.

Patented Aug. 1, 1922.

Inventor
Harry C. Mallory
By his Attorneys
Edwards, Sager & Richmond

UNITED STATES PATENT OFFICE.

HARRY C. MALLORY, OF BELLPORT, NEW YORK.

COOLING SYSTEM FOR INTERNAL-COMBUSTION ENGINES.

1,424,664. Specification of Letters Patent. Patented Aug. 1, 1922.

Application filed April 20, 1917. Serial No. 163,332.

*To all whom it may concern:*

Be it known that I, HARRY C. MALLORY, a citizen of the United States, residing at Bellport, in the county of Suffolk and State of New York, have invented certain new and useful Improvements in Cooling Systems for Internal-Combustion Engines, of which the following is a specification.

The principal object of my invention is to provide new and improved apparatus for maintaining the proper temperature of an internal combustion engine. Another object is to provide a new and improved method for accomplishing this result. A further object of my invention is to utilize some of the heat produced in the operation of such apparatus that would otherwise be wasted.

My invention is characterized by novel provisions for cooling an engine by the vaporization of a suitable cooling liquid, and the subsequent condensation of the vapors thus generated and the return of the liquid of condensation to the engine cooling space or spaces.

In the preferred mode of carrying out the invention I surround the cylinders of an engine with which the invention is to be used by a body of a suitable cooling liquid held in a receptacle having a vapor space above the liquid body into which vapors generated by the ebullition of the cooling liquid may rise freely. The cooling liquid receptacle is connected to a condenser in a closed circulating system so that the vapors generated in the receptacle will pass to the condenser and the liquid of condensation formed in the condenser will return to the receptacle, and I add a gas as air to, or withdraw it from the circulating system as required to maintain a pressure in the vapor space of the cooling liquid receptacle corresponding to the pressure of saturated vapor of the cooling liquid at the temperature which I desire the body of cooling liquid to have. In general this temperature is well below 212° F. and the pressure in the circulating system is appreciably below that of the atmosphere.

To withdraw air from the circulating system I connect the latter to a suitable air exhauster. In some cases the desired air exhausting effect may advantageously be obtained by the simple expedient of connecting an air outlet from the condenser to the engine cylinder space through the suction intake manifold of the engine so that the partial vacuum periodically created in the engine cylinder or cylinders is utilized to draw air out of the radiators. The small amount of water vapor mixed with the air drawn out of the circulating system and passed into the engine cylinders with this arrangement tends to minimize carbon troubles in the latter.

I ordinarily regulate the pressure in the circulating system by the use of a vacuum relief valve which can be adjusted to automatically open and admit air as required to prevent the vacuum or minus pressure in the system from exceeding the desired amount. In practice, however, especially in automobile use, in addition to the air admitted by the vacuum relief valve, more or less air is constantly entering the system by leakage through the various joints of the system.

With suitably proportioned apparatus, utilized in the manner described, I can normally maintain a constant cooling temperature regardless of the temperature of the external atmosphere or the load on the engine since the temperature of the cooling liquid will correspond at all times to its boiling point at the pressure maintained in the system. The system as a whole operates in effect to maintain as much or as little air in the condenser at any instant as is required to give the condenser the condensing capacity required at that instant. The range of temperature regulation obtainable by varying the vapor pressure in the system, can be augmented by varying the character of the cooling liquid as by adding ingredients to water to raise or lower its boiling point. The invention may advantageously be employed with internal combustion engines used for practically all purposes, but is of especial utility when used with engines which like automobile engines are subjected to very variable loads or to widely varying atmospheric cooling effects. In adapting an existing water cooled engine to use with the present invention the cooling receptacle may be formed in whole or in part by the cooling water jacket of the engine. In automobile use the condenser required may take the place of the ordinary automobile radiator, though in this as in other uses, the condenser of the cooling system may be formed in whole or in part by coils or radiators used in room heating. In the following specification, I describe a few specific embodiments of my invention and some of its objects and advantages will be further discussed after those examples have been presented. The invention is defined in the appended claims.

Figure 1:
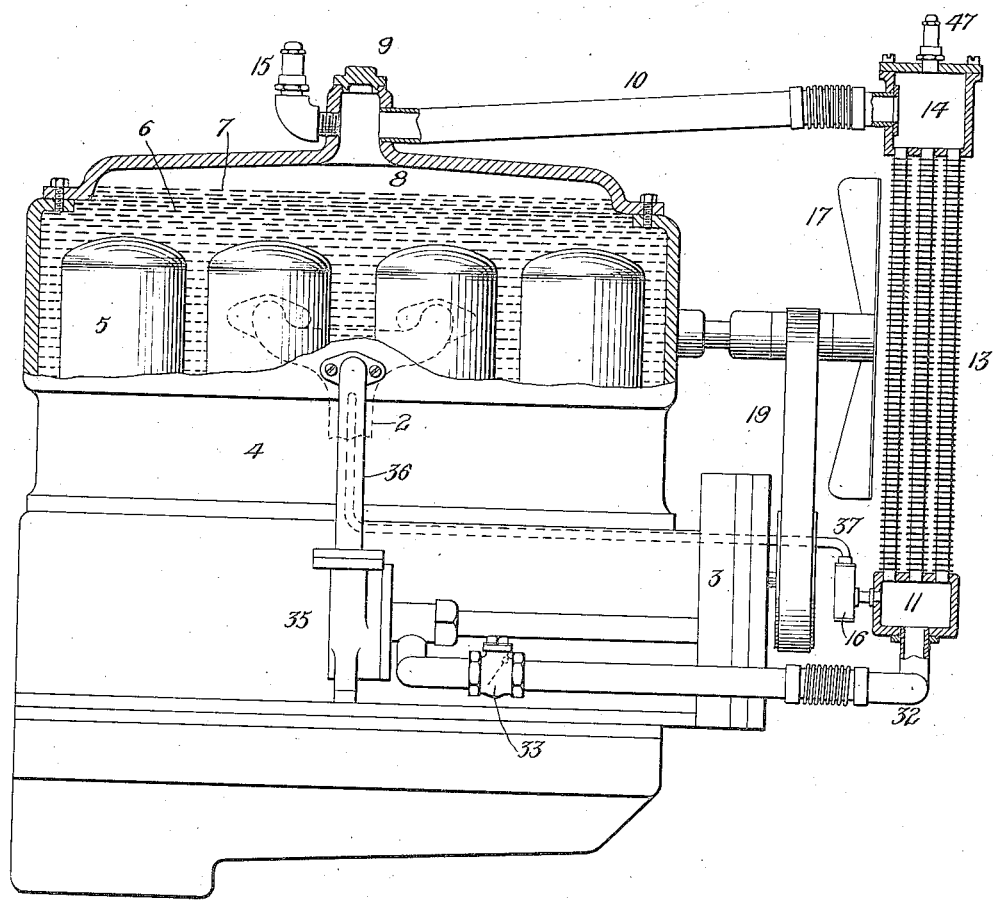
Fig. 1 is a side elevation partly in section showing my improved temperature controlling system as embodied in connection with an ordinary automobile engine.

Referring to the embodiment of my invention shown in Fig. 1, the engine 4 has its cylinders 5 surrounded by a separated wall enclosing a space 6 to serve for a water jacket. This space is not entirely filled by the water but the latter has a free level surface 7 with a vapor space 8 above it. The water may be introduced by removal of the plug 9, and a safety relief valve 15 is provided on the casing and is set to discharge at a little above normal atmospheric pressure, say for example at one pound above atmospheric pressure.

From the steam space 8 the pipe 10 leads to the upper header 14 of the air cooled radiator 13, and from the lower header 11 a water return pipe 32 leads through the check valve 33 and pump 35 back to the water space 6 around the engine cylinders 5. The pump 35 is driven by gearing within the casing 3 from the main engine shaft, and from this same gearing the fan 17 is driven by the belt 19.

A vacuum relief valve 47 is placed on the header 14 and is adjusted to admit air as required to prevent the pressure in the system falling below the vacuum or minus pressure desired for the particular use contemplated.

An air escape valve 16 is connected to the lower header 11 by means of the pipe 21, and a discharge pipe 37 leads therefrom to a point within the suction intake manifold 2 of the engine.

Figure 2:
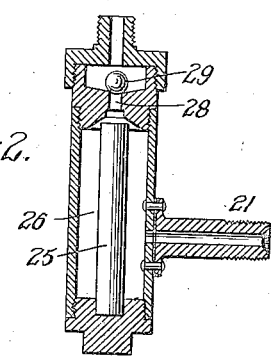
Fig. 2 is a section of an air valve which forms a part of the apparatus of Fig. 1.

The structure of the air valve 16 is shown in some detail in Fig. 2. There is a ball check valve 29 over a port 28 so that, in any case, the valve will not permit air to enter or reenter the radiator at the lower header 12. Moreover, the bar 25 has a high coefficient of temperature expansion so that it will be contracted as shown in the figure when surrounded by relatively cool air and will permit the air to escape, which action will be facilitated by the suction through the pipe 37. However, when steam passes from the radiator header 11 to the chamber 26, its higher temperature will expand the member 25 to close the port 28 and prevent any continued escape of steam from the radiator.

The flexible tubular joints 60 and 61 of circumferentially corrugated thin metal in the respective conduits 10 and 32 serve to absorb vibrations and yield to differential stresses between the engine and the condenser.

In operation, the water in the space 6 will be heated by conduction and convection from the engine cylinders 5 to the boiling point and its vapor will pass through the conduit 10 to the upper header 14 and into the radiating tubes 13 where it will condense and collect in the lower header 11 and be returned in its liquid condition by the pump 35 to the space 6. If, at any time, the pressure becomes excessive, the safety valve 15 will permit the escape of the steam. If the volume of steam discharged through the conduit 10 is less than the capacity of the radiator 13 to condense, the condensation will be so effective that the pressure within the system will drop to a point where the vacuum relief valve 47 will open and admit air to the header 14. This air will find its way to the air valve 16 and entering the same will cool and contract the member 25, thus opening the port 28, and escaping through the suction conduit 37 to intake manifold 2. The system can be maintained at any desirable pressure below atmospheric pressure by adjusting the vacuum relief valve 47 accordingly.

When the engine is idle, the check valve 33 prevents back flow of water into the radiator 13, so that the entire radiating surface of the condenser 13 is available at all times.

When the engine stops, the cooling system ceases to operate and practically the entire body of hot water remains in the engine jacket and keeps the engine warm for a considerable length of time, which will facilitate quick starting. After the engine has stood for some time the vapor in the condenser will condense and it will admit air through the relief valve 47. Upon starting the engine, the air valve 16 will be in condition to pass air and the suction will immediately be exerted thereon through the branch conduit 37 in the suction intake manifold 2. Accordingly the air in the condenser will be quickly exhausted as vapor comes over from the water in the engine jacket to replace it. Thus at starting, my improved system immediately functions efficiently without any delay or difficulty on account of accumulation of air in the condenser. In this system of cooling, the latent heat of vaporization, which is many times greater than the sensible heat, is utilized to transmit the heat from the engine cylinders to the atmosphere and this makes my method much more efficient than those methods which depend merely on the circulation of the liquid without vaporization thereof.

Another advantage of my system as compared with those heretofore commonly employed is that it operates equally well in winter or summer weather, making it possible in all cases to maintain the engine cylinders at or about the temperature, which is considered the most economical working temperature. In the all-liquid cooling systems heretofore commonly used, great difficulty has been experienced in getting the proper ratio of radiator cooling surface for summer and winter conditions of operation and it has been necessary partially to cover the radiator in winter.

By omitting the suction pipe 37, and properly adjusting the vacuum relief valve 47, the system will operate approximately at atmospheric pressure and at 212 F. at sea-level.

Figure 3:
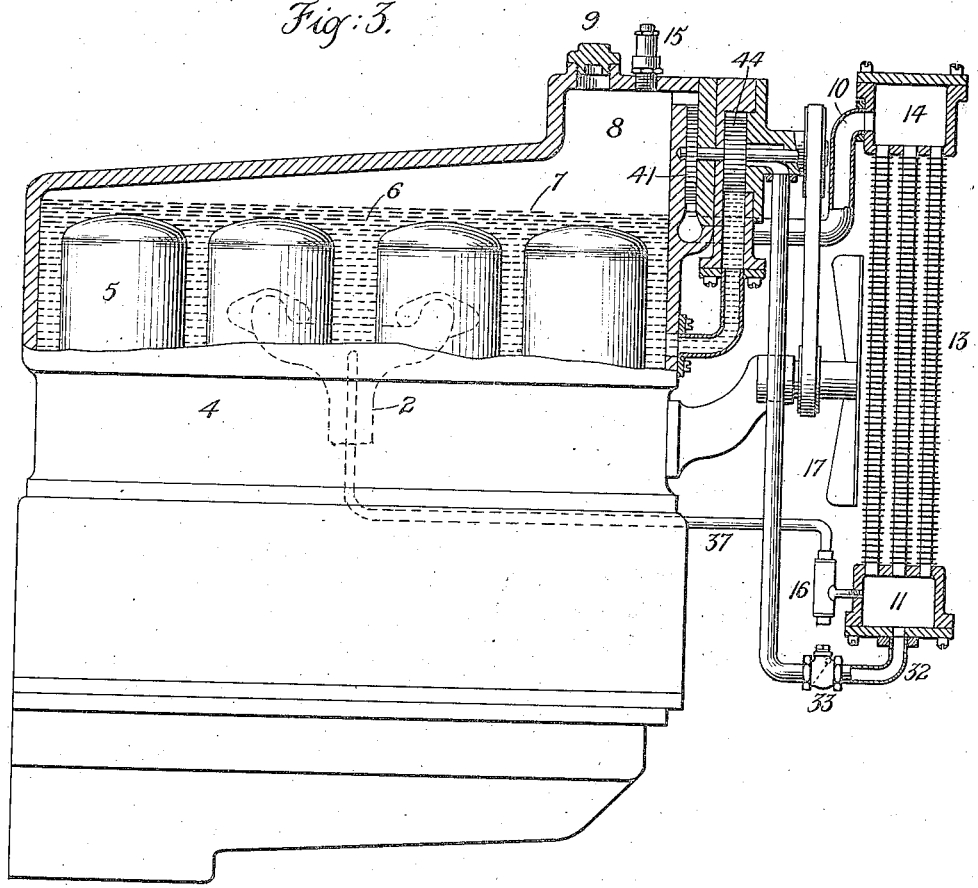
Fig. 3 shows a modified embodiment of my invention.

Referring to Fig. 3, this shows the pump 44 driven by a steam turbine 41 which is interposed in the steam conduit 10. Thus, the current of steam passing from the vapor space 8 through the conduit 10 to the header 14 operates the turbine 41 which drives the pump 44 to return the water of condensation from the lower header 11 through the check valve 33 back to the water space 6. The vacuum relief valve is omitted from this combination, as in this case a high vacuum is desired at all times so that there shall be a distinct pressure drop from the steam space 8 to the header 14 to be effective to drive the turbine 41. The turbine 41 serves not only to drive the pump 44 but also the fan 17. Otherwise the general mode of operation of the system shown in Fig. 3 is substantially the same as for Fig. 1.

Figure 4:
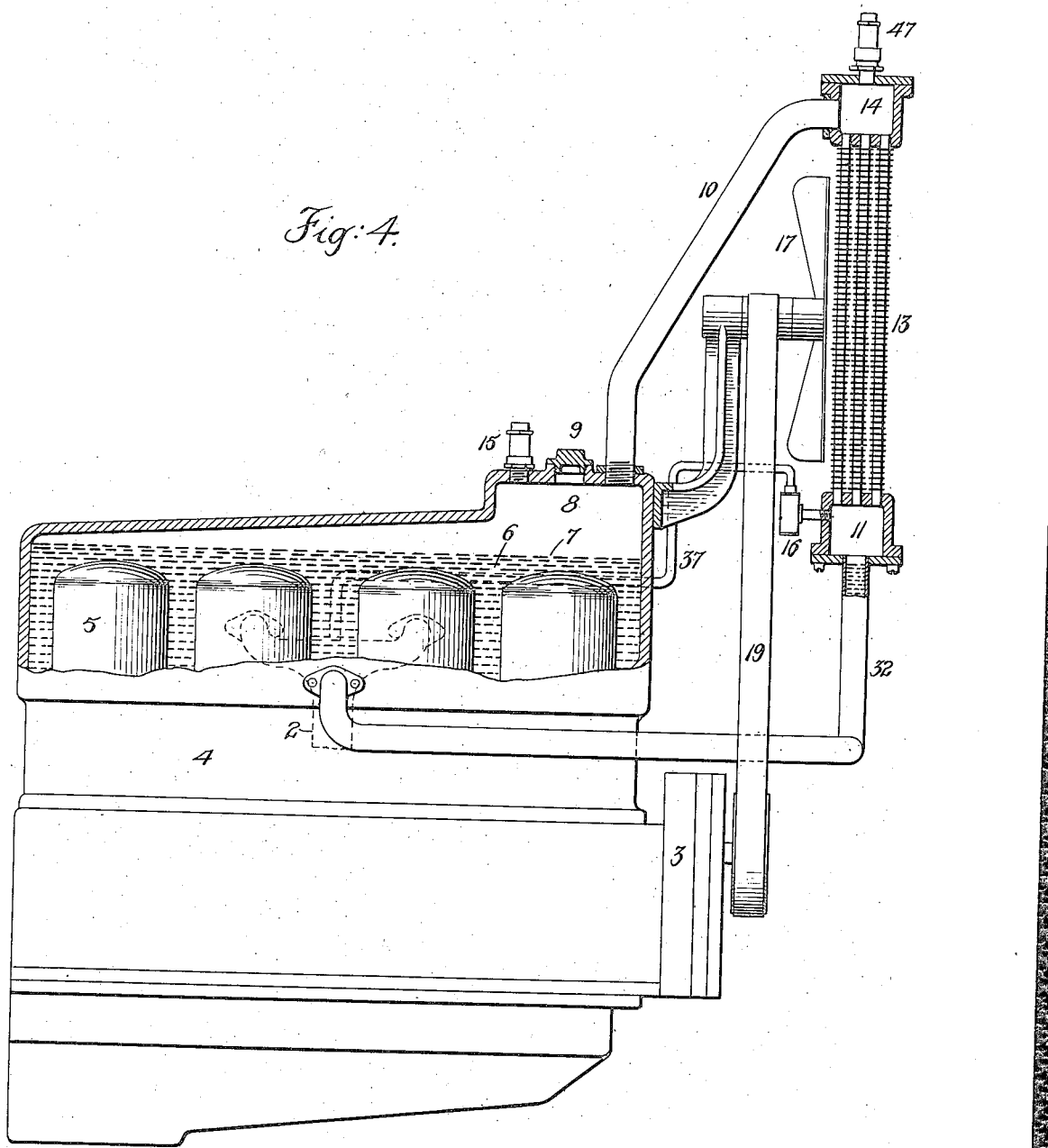
Fig. 4 shows a further modification in which the return of the condensed cooling fluid to the engine is due to gravity.

Referring to Fig. 4, this shows the radiator placed in an elevated position, as might well be done on a commercial automobile truck, so that the lower header 11 is at least as high as the water level 8 in the engine jacket 6. Accordingly, the steam goes to the upper header 14 through the conduit 10 and the water drains back from the lower header 11 through the conduit 32 to the engine water space 6 without the necessity for any pump and without any check valve in the return conduit 32. The safety valve 15, vacuum relief valve 47, and the air discharge valve are all the same as in the system of Fig. 1 and they operate in the same way as described in that connection.

Figure 5:
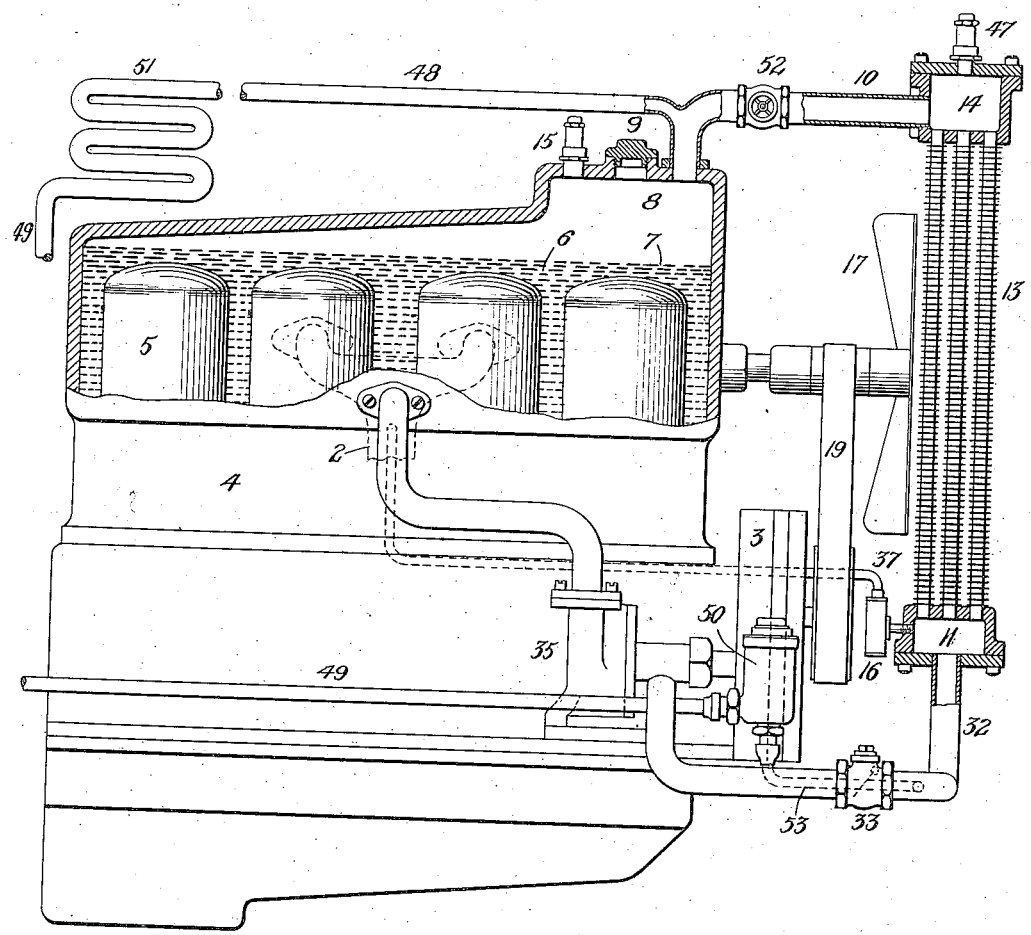
Fig. 5 shows apparatus for diverting some of the vapor to a heater.

Fig. 5 corresponds to Fig. 1 with the addition of elements of apparatus to facilitate employing part of the steam for heating purposes in or about the automobile. The conduit 10 has a valve 52 by which the flow of steam to the radiator can be slightly impeded. Between the engine casing and the valve 52 is a branch pipe 48 leading to a heating coil 51 placed at any convenient point in the car. The passage through the coil 51 is continued through a return conduit 49 back to a steam trap 50 which operates in the well-known manner to permit the water of condensation to drain back through the pipe 53 into the conduit 32 in front of the check valve 33, but prevents the escape of steam. The valve 52 should be adjusted so that the steam will have a tendency to fill the coil 51 before the differential pressure at the valve 52 becomes sufficient to open it and pass the steam to the header 14.

It will be seen that my improved system is closed to the outside atmosphere and in its normal operation it will open only at the vacuum relief valve 47 to admit air and at the air valve 16 to discharge air. Thus, there is little or no escape of vapor to the outside air, as is the case in the common all-liquid type of cooling systems, and with my system it is unnecessary to replenish the water over long periods of time. If a non-freezing liquid is added to the water it will not be lost by boiling away as it would in an all-liquid system. The volume of water in the system is less than it would be if the radiator were filled with water, and in operation this water is quickly brought to the boiling temperature and is maintained there, whether the engine be running light or heavy, whereas in the all-liquid systems heretofore commonly used the water may be hotter at one time than another according to load and other conditions. My system can be operated at any desirable temperature below the temperature of 212 degrees F. which corresponds to boiling at atmospheric pressure at sea-level. In most cases I contemplate setting the vacuum relief valve 47 to open at several pounds below atmospheric pressure and at this lower pressure the water will boil at a temperature considerably below 212° F. and the system will operate automatically to maintain the water around the engine cylinders at approximately this temperature. A temperature can also be obtained by checking the free draft of air around the radiator. With my cooling system a relatively high coefficient of heat transfer from the engine cylinder walls to the boiling body of cooling fluid is secured, and with properly designed apparatus there is practically no possibility of the formation of air and steam pockets in the cooling system which will interfere with the circulation, or with the maintenance of contact between the cooling liquid and engine cylinder walls exposed to such contact.

Having thus described my invention, I declare that what I claim as new and desire to secure by Letters Patent, is:—

1. The method of regulating the temperature in the liquid containing cooling space of an internal combustion engine cooling system comprising a condenser connected to said space, which consists in maintaining a pressure in said condenser which is approximately constant under varying load conditions and below that of the atmosphere.

2. The method of regulating the temperature in the liquid containing cooling space of an internal combustion engine cooling system comprising a liquid containing cooling space and a condenser connected to said space, which consists in varying the capacity of the condenser as required to maintain a pressure in said condenser which is approximately constant under varying load conditions and below that of the atmosphere.

3. The method of regulating the temperature in the liquid containing cooling space of an internal combustion engine cooling system comprising a liquid containing cooling space and a condenser connected to said space, which consists in adding air to and withdrawing it from the condenser as required to maintain a pressure in said condenser which is approximately constant and below that of the atmosphere.

4. The method of maintaining a low and approximately constant temperature in the cooling space of an internal combustion engine which consists in supplying a cooling liquid to said space as required to maintain the latter partially filled with the cooling liquid and withdrawing vapor from the space as required to maintain a pressure in the portion of said space not occupied by liquid which is approximately constant under varying load conditions and below that of the atmosphere.

5. The method of maintaining a temperature appreciably below 212° in the cooling liquid jacket of an internal combustion engine cooling system including a condenser associated with said jacket in a closed circulating system adapted to pass vapor generated by heating liquid in the jacket into the condenser and to return liquid of condensation from the condenser to the jacket, which consists in adding air to, and drawing it from the system as required to maintain a vapor pressure therein appreciably below that of the atmosphere.

6. The method of regulating the temperature in the cooling jacket of an internal combustion engine cooling system including a condenser associated with the cooling jacket in a closed circulating system adapted to pass vapor generated by heating liquid in the jacket to the condenser and to return liquid of condensation from the condenser to the jacket, which consists in adding air to, and drawing it from said system as required to maintain a vapor pressure therein approximating the pressure of saturated vapor of the cooling liquid at the temperature which it is desired to maintain in said cooling jacket.

7. In an internal combustion engine cooling system comprising a liquid containing cooling space and a condenser connected to said space for condensing the vapor of a cooling liquid generated by heat absorbed by the liquid in said space, the improvement which consists in means for regulating the capacity of the condenser as required to maintain a pressure in the condenser which is approximately constant under varying load conditions and below that of the atmosphere.

8. In an internal combustion engine cooling system comprising a liquid containing cooling space and a condenser connected to said space for condensing the vapor of a cooling liquid generated by heat absorbed by the liquid in said space, the improvement which consists in suction means for withdrawing air from said condenser, and a vacuum relief valve for admitting air to said condenser to limit the vacuum therein.

9. In an internal combustion engine cooling system, the combination with a liquid containing cooling receptacle, of a condenser associated with said receptacle in a closed circulating system adapted to pass vapor generated by the heat imparted to the liquid in the receptacle to said condenser and to return liquid of condensation from the condenser to the receptacle, means to admit air to said circulating system when the pressure therein falls to a predetermined point, and means permitting the escape of air but preventing the escape of vapor from the circulating system.

10. In an internal combustion engine cooling system, the combination with a liquid containing cooling receptacle, of a condenser associated with said receptacle in a closed circulating system adapted to pass vapor generated by the heat imparted to the liquid in the receptacle to the condenser and to return liquid of condensation from the condenser to the receptacle, suction producing means for removing air from the circulating system, and means for admitting air to said circulating system as required to prevent the maintenance of a vacuum therein in excess of a predetermined amount.

11. In an internal combustion engine cooling system, the combination with a liquid containing cooling receptacle, of a condenser associated with said receptacle in a closed circulating system adapted to pass vapor generated by the heat imparted to the liquid in the receptacle to said condenser and to return liquid of condensation from the condenser to the receptacle, and a vacuum relief valve to admit air to the circulating system under predetermined conditions.

12. In an internal combustion engine cooling system, the combination with a liquid containing cooling receptacle, of a condenser associated with said receptacle in a closed circulating system adapted to pass vapor generated by the heat imparted to the liquid in the receptacle to said condenser and to return liquid of condensation from the condenser to the receptacle, a pressure regulating valve to admit air to, and a non-return valve to pass air from said circulating system.

13. In an internal combustion engine cooling system, the combination with a liquid containing cylinder cooling jacket having a free vapor space above the liquid therein, of a condenser associated with said jacket in a closed circulating system comprising a conduit for passing vapor from said vapor space to the condenser and a separate conduit for returning liquid of condensation from the condenser to the jacket, and means for admitting air to and withdrawing it from said circulating system as required to maintain an approximately constant pressure less than atmospheric in said vapor space.

14. In an internal combustion engine cooling system, the combination with a liquid containing cooling receptacle, of a condenser associated with said receptacle in a closed circulating system adapted to pass vapor generated by the heat imparted to the liquid in the receptacle to said condenser and to return liquid of condensation from the condenser to the receptacle, a heater connected to said receptacle to receive vapor therefrom, and a return connection including a steam trap from the heater to said receptacle.

15. In an internal combustion engine cooling system, the combination with a liquid containing cooling receptacle, of a condenser associated with said receptacle in a closed circulating system adapted to pass vapor generated by the heat imparted to the liquid in the receptacle to said condenser and to return liquid of condensation from the condenser to the receptacle, a safety valve limiting the maximum pressure in said circulating system, and a vacuum relief valve limiting the minimum pressure therein.

16. In an internal combustion engine cooling system, the combination with a liquid containing cooling receptacle, of a condenser associated with said receptacle in a closed circulating system adapted to pass vapor generated by the heat imparted to the liquid in the receptacle to said condenser and to return liquid of condensation from the condenser to the receptacle and having an air outlet, suction producing means connected to said air outlet, and an automatic air valve permitting the escape of air and preventing the escape of vapor through said outlet.

17. The combination with an internal combustion engine having a working cylinder and a liquid containing cylinder cooling jacket of a condenser associated with the jacket in a closed circulating system adapted to pass vapor generated by the heat imparted to the liquid in said jacket to said condenser and to return liquid of condensation from the condenser to the jacket, said system having an air outlet connected to said cylinder.

18. The combination with an internal combustion engine having a working cylinder and a liquid containing cylinder cooling jacket of a condenser associated with the jacket in a closed circulating system adapted to pass vapor generated by the heat imparted to the liquid in said jacket to said condenser and to return liquid of condensation from the condenser to the jacket, said system having an air outlet connected to the cylinder, and a non-return valve preventing back-flow through said air outlet into said system.

19. The combination with an internal combustion engine having a suction fuel intake and a liquid containing cylinder cooling jacket, of a condenser associated with the jacket in a closed circulating system adapted to pass vapor generated by the heat imparted to the liquid in said jacket to said condenser and to return liquid of condensation from the condenser to the jacket, and an air discharge connection from said system to said intake.

20. The combination with an internal combustion engine having a suction fuel intake and a liquid containing cylinder cooling jacket, of a condenser associated with the jacket in a closed circulating system adapted to pass vapor generated by the heat imparted to the liquid in said jacket to said condenser and to return liquid of condensation from the condenser to the jacket, and an air discharge connection from said system to said intake, and a vacuum relief valve for admitting air to said system to limit the vacuum therein.

21. In an internal combustion engine cooling system, the combination with a liquid containing cooling receptacle, of a condenser associated with said receptacle in a closed circulating system adapted to pass vapor generated by the heat imparted to the liquid in said receptacle to said condenser and to return liquid of condensation from the condenser to the receptacle, and means for varying the capacity of the condenser as required to maintain a pressure in said vapor space which is approximately constant under varying load conditions and less than atmospheric.

22. In an internal combustion engine cooling system the combination with a liquid containing cooling receptacle of a condenser associated with said receptacle in a closed circulating system adapted to pass vapor generated by the heat imparted to the liquid in said receptacle to said condenser and to return liquid of condensation from the condenser to the receptacle, and means for varying the capacity of the condenser in automatic response to the conditions of operation as required to maintain an approximately constant pressure in said circulating system; said means including provisions whereby the said pressure thus maintained may be adjusted.

23. The combination with an internal combustion engine cooling system comprising a liquid containing cooling receptacle and a condenser associated with said receptacle in a closed circulating system adapted to pass vapor generated by the heat imparted in the liquid in the receptacle to said condenser and to return liquid of condensation from the condenser to the receptacle, of a heater connected to said system to receive vapor therefrom, and means for regulating the capacity of said condenser as required to maintain a pressure therein which is below that of the atmosphere and is approximately constant, notwithstanding variations in load conditions and in the amount of vapor passing to said heater.

HARRY C. MALLORY.